United States Patent
Barabash et al.

(10) Patent No.: US 7,945,773 B2
(45) Date of Patent: May 17, 2011

(54) FAILOVER OF BLADE SERVERS IN A DATA CENTER

(75) Inventors: Katherine Barabash, Haifa (IL); James F. Boland, IV, Apex, NC (US); Eric R. Kern, Chapel Hill, NC (US); Irit Loy, Bet Hanania (IL); William J. Vanca, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 11/857,298

(22) Filed: Sep. 18, 2007

(65) Prior Publication Data

US 2009/0077370 A1 Mar. 19, 2009

(51) Int. Cl.
*G06F 1/24* (2006.01)
*G06F 11/07* (2006.01)

(52) U.S. Cl. ............... 713/100; 714/2; 714/3; 714/4; 714/100

(58) Field of Classification Search ............... 713/100; 714/2, 3, 4, 100
See application file for complete search history.

(56) References Cited

U.S. PATENT DOCUMENTS

| | | | |
|---|---|---|---|
| 6,934,875 B2 | 8/2005 | Kashyap | |
| 6,971,044 B2 | 11/2005 | Geng et al. | |
| 7,093,120 B2 | 8/2006 | Keohane et al. | |
| 7,137,040 B2 | 11/2006 | Bae et al. | |
| 7,174,390 B2 | 2/2007 | Schulter et al. | |
| 7,634,681 B2 * | 12/2009 | Takamoto et al. | 714/4 |
| 2005/0083749 A1 | 4/2005 | Keohane et al. | |
| 2005/0138316 A1 * | 6/2005 | Groves et al. | 711/170 |
| 2006/0107108 A1 | 5/2006 | Geng et al. | |
| 2006/0112219 A1 | 5/2006 | Chawla et al. | |
| 2006/0136704 A1 | 6/2006 | Arendt et al. | |
| 2006/0173912 A1 | 8/2006 | Lindvall et al. | |
| 2007/0055853 A1 * | 3/2007 | Hatasaki et al. | 713/1 |
| 2007/0088980 A1 | 4/2007 | Greenspan et al. | |
| 2007/0174658 A1 * | 7/2007 | Takamoto et al. | 714/4 |
| 2007/0174659 A1 * | 7/2007 | Takuwa et al. | 714/4 |
| 2007/0214387 A1 * | 9/2007 | Nakajima et al. | 714/13 |

(Continued)

FOREIGN PATENT DOCUMENTS

WO WO 2005/057318 A2 6/2005

(Continued)

OTHER PUBLICATIONS

Larcom et al.; Failover of Computing Devices Assigned to Storage-Area Network (SAN) Storage Volumes; IBM Dossier RPS920060108; 2006; International Business Machines Corporation.

(Continued)

*Primary Examiner* — Vincent T Tran
(74) *Attorney, Agent, or Firm* — Brandon C. Kennedy; Cynthia G. Seal; Biggers & Ohanian, LLP

(57) ABSTRACT

Failover of blade servers in a data center, including powering off by a system management server a failing blade server, the failing blade server characterized by a machine type, the failing blade server mapped to remote computer boot storage administered through a Storage Management Initiative-Specification ('SMI-S') provider; identifying, by the system management server by use of the SMI-S provider from a pool of standby blade servers, a replacement blade server; remapping by the system management server through the SMI-S provider the remote computer boot storage of the failing blade server to the replacement blade server; and powering on the replacement blade server by the system management server.

12 Claims, 3 Drawing Sheets

U.S. PATENT DOCUMENTS

2008/0028107 A1* 1/2008 Cherian et al. .................... 710/9
2008/0133851 A1* 6/2008 Miyazaki et al. ............. 711/154
2008/0133963 A1* 6/2008 Katano et al. ..................... 714/4
2008/0177871 A1* 7/2008 Howard et al. ............... 709/222

FOREIGN PATENT DOCUMENTS

WO    WO 2006/090373 A1    8/2006

OTHER PUBLICATIONS

Lucas et al.; Method and Apparatus to Provide Independent Drive Enclosure Blades in a Blade Server System with Low Cost High Speed Switch Modules; IBM Dossier SJO20060039; 2006; International Business Machines Corporation.

* cited by examiner

```
┌─────────────────────────────────────────────────────────────────┐
│ Power Off By A System Management Server A Failing Blade Server, │
│ The Failing Blade Server Characterized By A Machine Type, The   │
│ Failing Blade Server Mapped To Remote Computer Boot Storage     │
│ Administered Through A Storage Management Initiative -          │
│ Specification ('SMI-S') Provider                                │
│ 204                                                             │
└─────────────────────────────────────────────────────────────────┘

┌─────────────────────────────────────────────────────────────────┐
│ Identify, By The System Management Server By Use Of The SMI-S   │
│ Provider From A Pool Of Standby Blade Servers, A Replacement    │
│ Blade Server                                                    │
│ 206                                                             │
└─────────────────────────────────────────────────────────────────┘

┌─────────────────────────────────────────────────────────────────┐
│ Remapping By The System Management Server Through The SMI-S     │
│ Provider The Remote Computer Boot Storage Of The Failing Blade  │
│ Server To The Replacement Blade Server                          │
│ 208                                                             │
│                                                                 │
│ ┌──────────────────────────┐   ┌──────────────────────────────┐ │
│ │ Move An Identifier Of    │   │ Replace, In An Association   │ │
│ │ The Remote Computer Boot │   │ With An Identifier Of The    │ │
│ │ Storage Mapped To The    │   │ Remote Computer Boot         │ │
│ │ Failing Blade Server     │   │ Storage, An Identifier Of    │ │
│ │ From An Association With │   │ The Failing Blade Server     │ │
│ │ An Identifier Of The     │   │ With An Identifier Of The    │ │
│ │ Failing Blade Server To  │   │ Replacement Blade Server     │ │
│ │ An Association With An   │   │ 224                          │ │
│ │ Identifier Of The        │   │                              │ │
│ │ Replacement Blade Server │   │                              │ │
│ │ 222                      │   │                              │ │
│ └──────────────────────────┘   └──────────────────────────────┘ │
└─────────────────────────────────────────────────────────────────┘

┌─────────────────────────────────────────────────────────────────┐
│ Power On The Replacement Blade Server By The System Management  │
│ Server                                                          │
│ 210                                                             │
└─────────────────────────────────────────────────────────────────┘
```

FIG. 3

FAILOVER OF BLADE SERVERS IN A DATA CENTER

BACKGROUND OF THE INVENTION

1. Field of the Invention

The field of the invention is data processing, or, more specifically, methods, apparatus, and products for failover of blade servers in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Blade computers are increasingly being used to run critical applications that require a high level of redundancy and fault tolerance. Various clustering solutions exist such as VMware's high availability and Microsoft's clustering technology, but these systems are often complex and high priced. HP has recently developed a solution for blade failover which is simple to setup, but requires virtualization of unique storage and network identifiers, WWN or MAC address, for example. A World Wide Name ('WWN') or World Wide Identifier ('WWID') is a unique identifier in a Fibre Channel or Serial Attached SCSI storage network, and a Media Access Control address ('MAC address') or Ethernet Hardware Address ('EHA') or hardware address or adapter address is a quasi-unique identifier attached to most network adapters. This virtualization of the WWN and MAC is found objectionable by many users and system administrators due to security concerns.

SUMMARY OF THE INVENTION

Methods, apparatus, and computer program products are disclosed for failover of blade servers in a data center, including powering off by a system management server a failing blade server, the failing blade server characterized by a machine type, the failing blade server mapped to remote computer boot storage administered through a Storage Management Initiative-Specification ('SMI-S') provider; identifying, by the system management server by use of the SMI-S provider from a pool of standby blade servers, a replacement blade server; remapping by the system management server through the SMI-S provider the remote computer boot storage of the failing blade server to the replacement blade server; and powering on the replacement blade server by the system management server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 sets forth a flow chart illustrating a further exemplary method for failover of blade servers in a data center according to embodiments of the present invention.

DETAILED DESCRIPTION OF EXEMPLARY EMBODIMENTS

Figure 1:
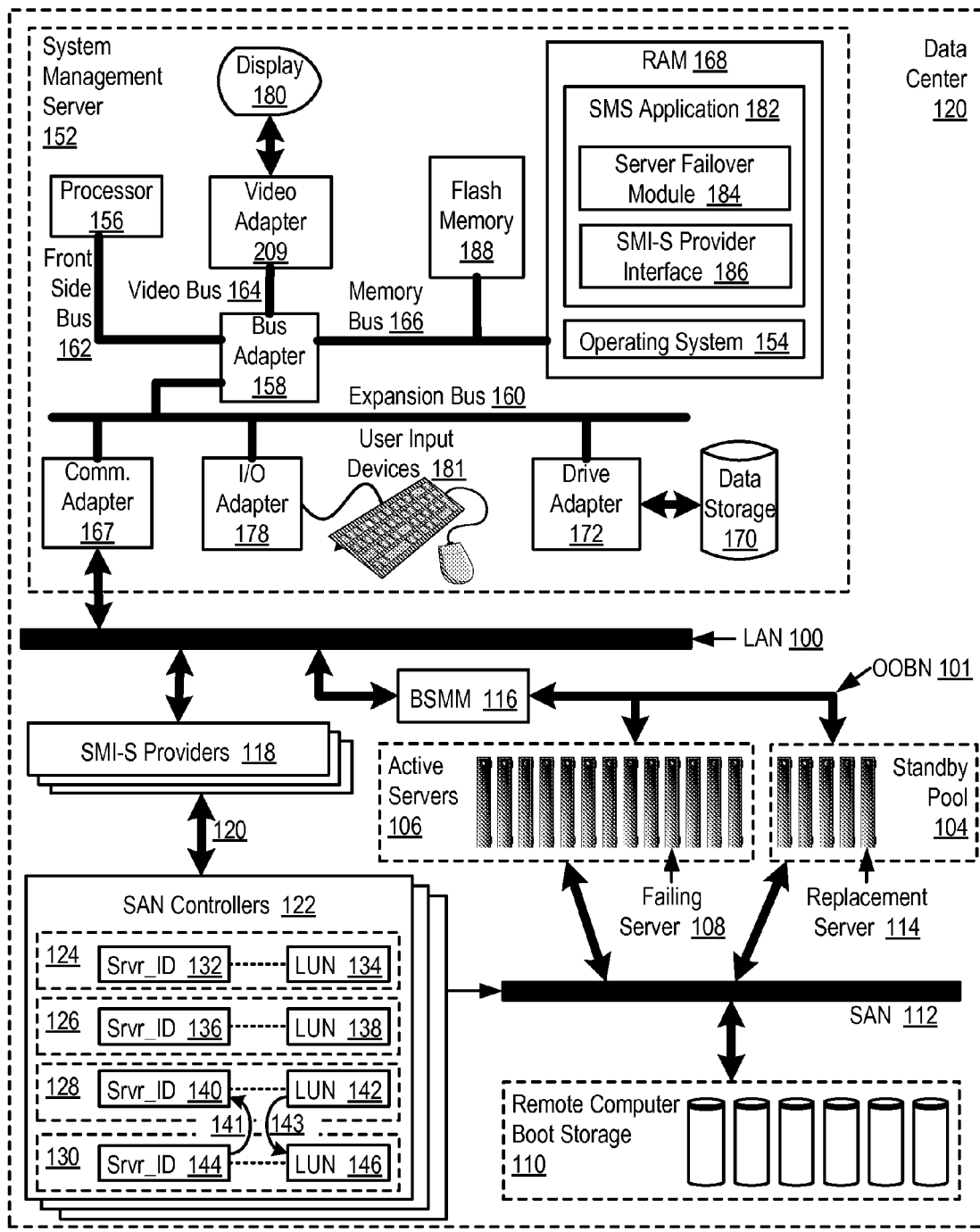
FIG. 1 sets forth a functional block diagram of an exemplary system implementing failover of blade servers in a data center according to embodiments of the present invention.

Exemplary methods, apparatus, and products for failover of blade servers in a data center in accordance with the present invention are described with reference to the accompanying drawings, beginning with FIG. 1. FIG. 1 sets forth a functional block diagram of an exemplary system implementing failover of blade servers (106) in a data center (120) according to embodiments of the present invention. The data center (120) is a facility used to house mission critical computer systems and associated components. Such a data center includes environmental controls (air conditioning, fire suppression, etc.), redundant/backup power supplies, redundant data communications connections, and high security, highlighted by biometric access controls to compartmentalized security zones within the facility. A data center is a facility used for housing a large amount of electronic equipment, typically computers and communications equipment. A data center is maintained by an organization for the purpose of handling the data necessary for its operations. A bank, for example, may have a data center, where all its customers'account information is maintained and transactions involving these accounts are carried out. Practically every company that is mid-sized or larger has some kind of data center with the larger companies often having dozens of data centers.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure. The example system of FIG. 1 includes a number of servers, active blade servers (106), a pool (104) of available standby blade servers, and a system management server (152). An active blade server (106) is a blade server presently in use to provide responses to user requests for data processing services from the data center (120). The example system of FIG. 1 also includes a pool (104) of available standby blade servers. A standby blade server is a blade server that is not presently in use to provide responses to user requests for data processing services from the data center (120) but is available to be brought into active service upon failure of an active blade computer.

The example system of FIG. 1 includes a blade server management module (116), an aggregation of computer hardware and software that is installed in a blade enclosure or blade center to provide support services for blade servers in the blade enclosure. Support services provided by the blade server management module (116) include monitoring health of blade servers and reporting health statistics to a system management server, power management and power control, save and restore configurations, discovery of available blade servers, event log management, memory management, and so on. An example of a blade server management module that can be used in systems that failover blade servers according to embodiments of the present invention is IBM's Advanced Management Module ('AMM'). The blade server management module (116) in this example communicates with a system management server (152) through a local area network ('LAN') (100), and the blade server management module (116) communicates with the blade servers (106, 104) through an out-of-band network (101). The LAN may be implemented as an Ethernet, an IP (Internet Protocol) network, or the like, and the out-of-band network (101) may be implemented as an Inter-Integrated Circuit ('I$^2$C') bus, a System Management Bus ('SMBus'), an Intelligent Platform Management Bus ('IPMB'), or the like.

Each blade server (104, 106) in this example may optionally be mapped to remote computer boot storage (110) through a storage area network ('SAN') (112). The boot storage (110) is 'remote' in the sense that all the system-level software, such as a kernel and other operating system software, that is needed to operate each server is stored, not on the server itself, but remotely from the server across a storage area network ('SAN') (112) on storage exposed to the blade servers through the SAN. The only boot-related software on the blade servers is a thin piece of system-level firmware required to initiate a boot from remote storage.

The SAN (112) is a network architecture that attaches remote computer storage devices such as disk arrays, for example, to blade servers so that, to the blade server's operating system, the remote storage devices appear as locally attached disk drives. That is, the remote boot storage (110) that can be mapped to the blade servers in this example is exposed by the SAN (112) to each server (104, 106) as a separate virtual drive. Such virtual drives are often referred to or referenced by a so-called logical unit number or 'LUN.' A LUN is an address for an individual disk drive and by extension, the disk device itself. A LUN, or the remote storage identified by a LUN, is normally not an entire disk drive but rather a virtual partition (or volume) of a RAID set—in this example a virtual disk drive that organized a portion of RAID (Redundant Array of Inexpensive Drives) storage and presents it to an operating system on a server as an actual disk drive. Most SANs use the SCSI protocol for communication between servers and disk drive devices, though they do not use its low-level physical interface, instead using a mapping layer. The mapping layer may be implemented, for example, with Fibre Channel (Fibre Channel Protocol or 'FCP' is Fibre Channel's SCSI interface), iSCSI (mapping SCSI over TCP/IP), HyperSCSI (mapping SCSI over Ethernet), Advanced Technology Attachment ('ATA') over Ethernet, and Infini-Band (supports mapping SCSI over InfiniBand and/or mapping TCP/IP over InfiniBand).

The example system of FIG. 1 also includes one or more SAN controllers (122). Each SAN controller (122) is a module of computer hardware and software that organizes physical disk storage into virtual drives to be exposed to blade servers (104, 106) through the SAN (112). Each SAN controller maintains mappings of blade servers to remote computer boot storage in the form of two-element data structures (124, 126, 128, 130) known as storage groups. Each storage group associates a blade server identifier (132, 136, 140, 144) and an identifier of a particular instance of remote computer boot storage (134, 138, 142, 146). The blade server identifier (132, 136, 140, 144) may be implemented as any data coding that uniquely identifies each blade server having mapped remote computer boot storage, such as, for example, a network adapter number for an adapter that connects a blade server to the SAN, a port identifier of a data communications port that connects a blade server to the SAN, a combination of an adapter number and a port identifier, a WWN, a MAC address, and so on. Note that the blade server identifiers, even if they are implemented as WWNs or MAC addresses, are actual identifiers, non-virtualized. The identifiers of remote computer boot storage (134, 138, 142, 146) in this example are implemented as LUNs. For ease of explanation, only four storage groups (124, 126, 128, 130) are illustrated here. Readers will recognize, however, that practical systems may include many storage groups, typically, for example, one or more storage groups for each active blade server.

The SAN controllers (122) are connected to the system management server (120) in this example through one or more SMI-S providers (118). 'SMI-S' stands for the Storage Management Initiative-Specification, a storage standard developed and maintained by the Storage Networking Industry Association ('SNIA'). SMI-S has also been ratified as ANSI standard ANSI INCITS 388-2004. SMI-S is based upon the Common Information Model and the Web-Based Enterprise Management standards defined by the Distributed Management Task Force. Each SMI-S provider (118) is a module of computer hardware and software that 'provides' to the system management server a standardized interface for control of a SAN (112) through a SAN controller (122). The control interface (120) exposed directly by the SAN controllers (122) is a proprietary interface unique to each make and model of SAN controller. The SMI-S controllers help avoid the need to program each system management server differently for each type of SAN controller in a system. By use of SMI-S providers, a system administrator can use any number of different makes and models of SAN controllers in a SAN and still need only a single control interface to control all the entire SAN. In this example, the SMI-S control interface is represented in the software in the system management controller as the SMI-S provider interface (186).

The system of FIG. 1 includes an exemplary system management server (152) useful in failover of blade servers in a data center according to embodiments of the present invention. The system management server (152) is a server of the data center (120) that automates many of the processes that are required to proactively manage servers in the data center, including capacity planning, asset tracking, preventive maintenance, diagnostic monitoring, troubleshooting, firmware updates, blade server failover, and so on. The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a system management server application program (182), a set of computer program instructions that operate the system management server so as to automatically under program control carry out processes required to manage servers in the data center, including capacity planning, asset tracking, preventive maintenance, diagnostic monitoring, troubleshooting, firmware updates, blade server failover, and so on. An example of a system management server application program (126) that can be improved to failover blade servers in a data center according to embodiments of the present invention is IBM's 'Director.'

Also stored in RAM (168) is a server failover module (130), a module of computer program instructions for automatic administration of blade server failover. The transfer of operation from a failing active blade server (108) to an available standby blade server (114) so as to ensure uninterrupted data flow, operability, and data processing services for users of the data center is referred to in this specification as 'failover.' Failover is the automated substitution of a functionally equivalent standby blade server for a failing active blade server. Failures that lead to failover can include a loss of power to an active blade server, a memory fault in an active blade server, a processor defect in an active blade server, loss of network connectivity for an active blade server, and so on. The data center (120) in this example provides automated failover from a failing active blade server to a standby blade server through the server failover module (130) of the system management server (152). An example of a server failover module that can be improved for failover of blade servers in a data center according to embodiments of the present invention is IBM's 'Boot From SAN Blade Failover Extension for IBM Director.'

Also stored in RAM (168) is an operating system (154). Operating systems useful for failover of blade servers in a data center according to embodiments of the present invention include UNIX™, Linux™, Microsoft XP™, AIX™, IBM's i5/OS™, and others as will occur to those of skill in the art. The operating system (154), the system management server application (182), the server failover module (184), and the SMI-S provider interface (186) in the example of FIG. 1 are shown in RAM (168), but many components of such software typically are stored in non-volatile memory also, such as, for example, on a disk drive (170) or in flash memory (188).

The system management server (152) of FIG. 1 includes disk drive adapter (172) coupled through expansion bus (160) and bus adapter (158) to processor (156) and other components of the system management server (152). Disk drive adapter (172) connects non-volatile data storage to the system management server (152) in the form of disk drive (170). Disk drive adapters useful in system management servers for failover of blade servers in a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory) (188), RAM drives, and so on, as will occur to those of skill in the art.

The example system management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary system management server (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for failover of blade servers in a data center according to embodiments of the present invention include modems for wired dial-up communications, Ethernet (IEEE 802.3) adapters for wired data communications network communications, and 802.11 adapters for wireless data communications network communications.

The example system management server of FIG. 1 operates generally to failover blade servers in a data center according to embodiments of the present invention by powering off a failing blade server and identifying a replacement blade server. The failing blade server is characterized by a machine type, and the failing blade server is mapped by at least one storage group (124, 126, 128, 130) to remote computer boot storage administered through an SMI-S provider. The system management server identifies a replacement blade server by querying an SMI-S provider to find in the standby pool a standby blade server that is powered off, is of the same machine type as the failing blade server, and has no current mapping to remote boot storage.

Having found a replacement for the failing blade server, the system management server then remaps the remote computer boot storage of the failing blade server to the replacement blade server. The remapping is carried out again by a call from the system management server application, from the server failover module, through the SMI-S provider interface to an SMI-S provider.

The SMI-S provider can remap the remote computer boot storage by moving an identifier of the remote computer boot storage mapped to the failing blade server from an association with an identifier of the failing blade server to an association with an identifier of the replacement blade server. Assume for purposes of explanation that blade server identifier (144) in storage group (130) identifies a replacement server (114) and that storage group (128) is an association that maps remote computer boot storage, LUN (142), to the failing blade server identified by blade server identifier (140). Moving an identifier of the remote computer boot storage mapped to the failing blade server from an association with an identifier of the failing blade server to an association with an identifier of the replacement blade server then can be carried out by moving (143) LUN (142) from storage group (128) to storage group (130) as LUN (146).

The SMI-S provider also, alternatively, can remap the remote computer boot storage of the failing blade server to the replacement blade by replacing, in an association with an identifier of the remote computer boot storage, an identifier of the failing blade server with an identifier of the replacement blade server. Assume for purposes of explanation that blade server identifier (144) in storage group (130) identifies a replacement server (114) and that storage group (128) is an association that maps remote computer boot storage, LUN (142), to the failing blade server identified by blade server identifier (140). Replacing, in an association with an identifier of the remote computer boot storage, an identifier of the failing blade server with an identifier of the replacement blade server then can be carried out by replacing (141) the blade server identifier (140) of the failing blade server in storage group (128) with the blade server identifier (144) of the replacement blade server.

Having remapped the remote computer boot storage to the replacement blade server, the system management server then powers on the replacement blade server—by a call to the blade server management module (116).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
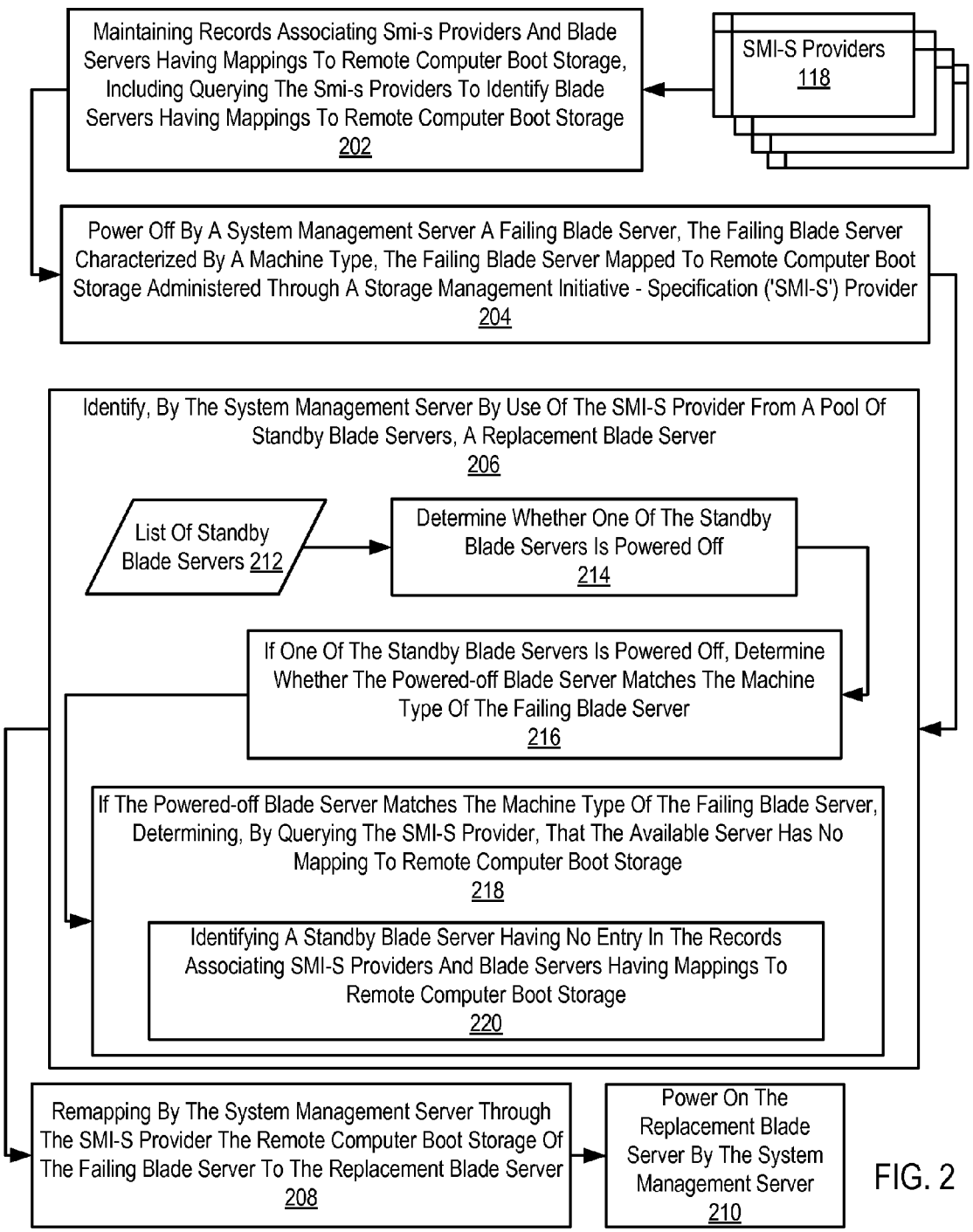
FIG. 2 sets forth a flow chart illustrating an exemplary method of failover of blade servers in a data center according to embodiments of the present invention.

For further explanation, FIG. 2 sets forth a flow chart illustrating an exemplary method of failover of blade servers in a data center according to embodiments of the present invention. The method of FIG. 2 may be implemented on a system like the one described above with regard to FIG. 1. The method of FIG. 2 is explained here, therefore, with reference both to FIG. 2 and also to FIG. 1.

The example method of FIG. 2 is implemented in a system in which a number of SMI-S providers (118) administer remote computer boot storage (110) for blade servers (104, 106) by exposing a standard control interface (186) for a SAN (112). The method of FIG. 2 includes maintaining (202) records associating SMI-S providers (118) and blade servers (104, 106) having mappings to remote computer boot storage (110). Maintaining such records is carried out by querying the SMI-S providers to identify blade servers having mappings to remote computer boot storage. The mapping is implemented in these examples as storage groups (124, 126, 128, 130), each of which associates a blade server identifier (132, 136, 140, 144) and a remote computer boot storage identifier (134, 138, 142, 146). The records associating SMI-S providers and blade servers having mappings to remote computer boot storage may be implemented in a table similar to Table 1, for example:

TABLE 1

| SMI-S Provider Identifiers | Identifiers Of Blade Servers Mapped To Remote Computer Boot Storage |
|---|---|
| P-001 | BS-043 |
| P-002 | BS-067 |
| P-003 | BS-123 |
| P-004 | BS-987 |
| ... | ... |

Table 1 includes two columns, one that stores identifiers of SMI-S providers and one that stores identifiers of blade servers having mappings to remote computer boot storage. Each record in Table 1 associates one SMI-S providers and one blade servers having a mapping to remote computer boot storage. Readers will recognize that Table 1 is only one example of a data structure capable of associating SMI-S providers and blade servers having mappings to remote computer boot storage. Examples of other data structures capable of associating SMI-S providers and blade servers having mappings to remote computer boot storage include linked lists, hash tables, C-style data structures, arrays, and so on.

The method of FIG. 2 also includes powering off (204) by a system management server (152) a failing blade server (108), where the failing blade server is characterized by a machine type, and the failing blade server is mapped to remote computer boot storage (110) administered through an SMI-S provider (118). The fact that a blade server is failing is detected and reported to the system management server (152) by a blade server management module (116). The powering off is implemented by a call from the system management server (152) to the blade server management module (116).

The method of FIG. 2 also includes identifying (206), by the system management server (152) by use of the SMI-S provider (118) from a pool of standby blade servers (104), a replacement blade server (114). The system management server (152) uses the SMI-S provider (118) to identify a replacement blade server by a call from the system management server application program (182) through the SMI-S provider interface (186) to the SMI-S provider (118) querying the SMI-S provider for available standby blade servers. The SMI-S provider maintains a list (212) of available standby blade servers, including various attributes of the standby blade servers, such as, for example, whether they are powered on, their machine types, whether they are mapped to remote computer boot storage, and so on. In the method of FIG. 2, identifying (206) a replacement server includes determining (214) whether one of the standby blade servers is powered off; if one of the standby blade servers is powered off, determining (216) whether the powered-off blade server matches the machine type of the failing blade server, and if the powered-off blade server matches the machine type of the failing blade server, determining (218) that the available server has no mapping to remote computer boot storage. Determining (218) that the available server has no mapping to remote computer boot storage can be carried out by identifying (220) a standby blade server having no entry in the records associating SMI-S providers and blade servers having mappings to remote computer boot storage. Table 1 above is an example of records associating SMI-S providers and blade servers having mappings to remote computer boot storage.

The method of FIG. 2 also includes remapping by the system management server through the SMI-S provider the remote computer boot storage of the failing blade server to the replacement blade server. Methods of remapping by the system management server through the SMI-S provider the remote computer boot storage of the failing blade server to the replacement blade server are described below with reference to FIG. 3. The method of FIG. 2 also includes powering on the replacement blade server—by a call from the server failover module (184) of the system management server (152) to the blade server management module (116).

For further explanation, FIG. 3 sets forth a flow chart illustrating a further exemplary method for failover of blade servers in a data center according to embodiments of the present invention. The method of FIG. 3 is similar to the method of FIG. 2, including as it does powering off (204) a failing blade server; identifying (206) a replacement blade server; remapping (208) the remote computer boot storage of the failing blade server to the replacement blade server; and powering on (210) the replacement blade server by the system management server. Like the description above of the method of FIG. 2, the method of FIG. 3 is explained here with reference to both FIG. 3 and also with reference to FIG. 1. In addition, however, the method of FIG. 3 illustrates two alternative methods (222, 224) of remapping (208) the remote computer boot storage of the failing blade server to the replacement blade server. The remapping is carried out again by a call from the system management server application (182), from the server failover module (184), through the SMI-S provider interface (186) to an SMI-S provider (118).

The SMI-S provider (118) can remap the remote computer boot storage by moving (222) an identifier of the remote computer boot storage mapped to the failing blade server from an association with an identifier of the failing blade server to an association with an identifier of the replacement blade server. Assume for purposes of explanation that blade server identifier (144) in storage group (130) identifies a replacement server (114) and that storage group (128) is an association that maps remote computer boot storage, LUN (142), to the failing blade server identified by blade server identifier (140). Moving (222) an identifier of the remote computer boot storage mapped to the failing blade server from an association with an identifier of the failing blade server to an association with an identifier of the replacement blade server then can be carried out by moving (143) LUN (142) from storage group (128) to storage group (130) as LUN (146).

The SMI-S provider (118) also, alternatively, can remap the remote computer boot storage of the failing blade server to the replacement blade by replacing (224), in an association with an identifier of the remote computer boot storage, an identifier of the failing blade server with an identifier of the replacement blade server. Assume for purposes of explanation that blade server identifier (144) in storage group (130) identifies a replacement server (114) and that storage group (128) is an association that maps remote computer boot storage, LUN (142), to the failing blade server identified by blade server identifier (140). Replacing (224), in an association with an identifier of the remote computer boot storage, an identifier of the failing blade server with an identifier of the replacement blade server then can be carried out by replacing (141) the blade server identifier (140) of the failing blade server in storage group (128) with the blade server identifier (144) of the replacement blade server.

In view of these explanations, readers will recognize that effecting failover of blade servers in a data center according to embodiments of the present invention provides the benefit of simple low cost failover of blade servers without requiring virtualization of World Wide Names or MAC addresses.

Exemplary embodiments of the present invention are described largely in the context of a fully functional computer system for failover of blade servers in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of failover of blade servers in a data center, the method comprising:

powering off by a system management server a failing blade server, the failing blade server characterized by a machine type, the failing blade server mapped to remote computer boot storage administered through a Storage Management Initiative-Specification ('SMI-S') provider;

identifying, by the system management server by use of the SMI-S provider from a pool of standby blade servers, a replacement blade server, including:
  determining whether one of the standby blade servers is powered off;
  if one of the standby blade servers is powered off, determining whether the powered-off blade server matches the machine type of the failing blade server, and
  if the powered-off blade server matches the machine type of the failing blade server, determining, by querying the SMI-S provider, that the available server has no mapping to remote computer boot storage;

remapping by the system management server through the SMI-S provider the remote computer boot storage of the failing blade server to the replacement blade server; and powering on the replacement blade server by the system management server.

2. The method of claim 1 wherein remapping by the system management server through the SMI-S provider the remote computer boot storage of the failing blade server to the replacement blade server further comprises moving an identifier of the remote computer boot storage mapped to the failing blade server from an association with an identifier of the failing blade server to an association with an identifier of the replacement blade server.

3. The method of claim 1 wherein remapping by the system management server through the SMI-S provider the remote computer boot storage of the failing blade server to the replacement blade server further comprises replacing, in an association with an identifier of the remote computer boot storage, an identifier of the failing blade server with an identifier of the replacement blade server.

4. The method of claim 1 wherein:
- a plurality of SMI-S providers administers remote computer boot storage for the blade servers;
- the method includes maintaining records associating SMI-S providers and blade servers having mappings to remote computer boot storage, including querying the SMI-S providers to identify blade servers having mappings to remote computer boot storage; and
- identifying a replacement blade server further comprises identifying a standby blade server having no entry in the records associating SMI-S providers and blade servers having mappings to remote computer boot storage.

5. The method of claim 1 wherein remapping by the system management server through the SMI-S provider the remote computer boot storage of the failing blade server to the replacement blade server further comprises moving an identifier of the remote computer boot storage mapped to the failing blade server from an association with an identifier of the failing blade server to an association with an identifier of the replacement blade server.

6. The method of claim 1 wherein remapping by the system management server through the SMI-S provider the remote computer boot storage of the failing blade server to the replacement blade server further comprises replacing, in an association with an identifier of the remote computer boot storage, an identifier of the failing blade server with an identifier of the replacement blade server.

7. The method of claim 1 wherein:
- a plurality of SMI-S providers administers remote computer boot storage for the blade servers;
- the computer program product includes computer program instructions capable of maintaining records associating SMI-S providers and blade servers having mappings to remote computer boot storage, including querying the SMI-S providers to identify blade servers having mappings to remote computer boot storage; and
- identifying a replacement blade server further comprises identifying a standby blade server having no entry in the records associating SMI-S providers and blade servers having mappings to remote computer boot storage.

8. Apparatus for failover of blade servers in a data center, the apparatus comprising a computer processor, a computer memory operatively coupled to the computer processor, the computer memory having disposed within it computer program instructions capable of:
- powering off by a system management server a failing blade server, the failing blade server characterized by a machine type, the failing blade server mapped to remote computer boot storage administered through a Storage Management Initiative-Specification ('SMI-S') provider;
- identifying, by the system management server by use of the SMI-S provider from a pool of standby blade servers, a replacement blade server, including:
  - determining whether one of the standby blade servers is powered off;
  - if one of the standby blade servers is powered off, determining whether the powered-off blade server matches the machine type of the failing blade server, and
  - if the powered-off blade server matches the machine type of the failing blade server, determining, by querying the SMI-S provider, that the available server has no mapping to remote computer boot storage;
- remapping by the system management server through the SMI-S provider the remote computer boot storage of the failing blade server to the replacement blade server; and
- powering on the replacement blade server by the system management server.

9. The apparatus of claim 8 wherein remapping by the system management server through the SMI-S provider the remote computer boot storage of the failing blade server to the replacement blade server further comprises moving an identifier of the remote computer boot storage mapped to the failing blade server from an association with an identifier of the failing blade server to an association with an identifier of the replacement blade server.

10. The apparatus of claim 8 wherein remapping by the system management server through the SMI-S provider the remote computer boot storage of the failing blade server to the replacement blade server further comprises replacing, in an association with an identifier of the remote computer boot storage, an identifier of the failing blade server with an identifier of the replacement blade server.

11. The apparatus of claim 6 wherein:
- a plurality of SMI-S providers administers remote computer boot storage for the blade servers;
- the apparatus includes computer program instructions capable of maintaining records associating SMI-S providers and blade servers having mappings to remote computer boot storage, including querying the SMI-S providers to identify blade servers having mappings to remote computer boot storage; and
- identifying a replacement blade server further comprises identifying a standby blade server having no entry in the records associating SMI-S providers and blade servers having mappings to remote computer boot storage.

12. A computer program product for failover of blade servers in a data center, the computer program product disposed in a computer readable recordable storage medium, the computer program product comprising computer program instructions that, when executed by a computer processor in a computer, cause the computer to carry out the steps of:
- powering off by a system management server a failing blade server, the failing blade server characterized by a machine type, the failing blade server mapped to remote computer boot storage administered through a Storage Management Initiative-Specification ('SMI-S') provider;
- identifying, by the system management server by use of the SMI-S provider from a pool of standby blade servers, a replacement blade server, including:
  - determining whether one of the standby blade servers is powered off;
  - if one of the standby blade servers is powered off, determining whether the powered-off blade server matches the machine type of the failing blade server, and
  - if the powered-off blade server matches the machine type of the failing blade server, determining, by querying the SMI-S provider, that the available server has no mapping to remote computer boot storage;
- remapping by the system management server through the SMI-S provider the remote computer boot storage of the failing blade server to the replacement blade server; and
- powering on the replacement blade server by the system management server.

* * * * *